I. P. Tice.
Spirit-Meter.
N° 72700
Patented Dec. 24, 1867.
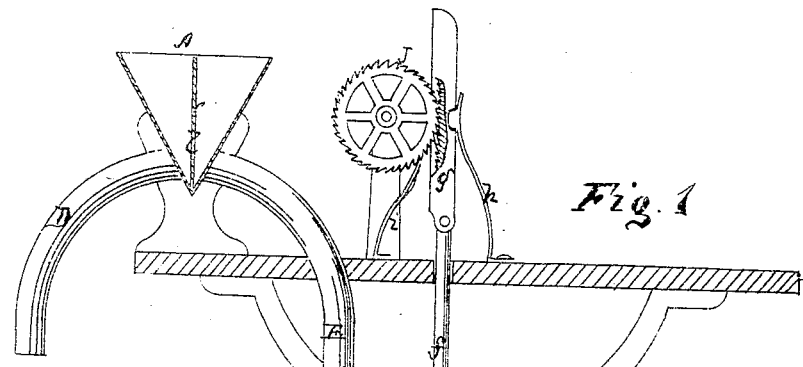
Fig. 1
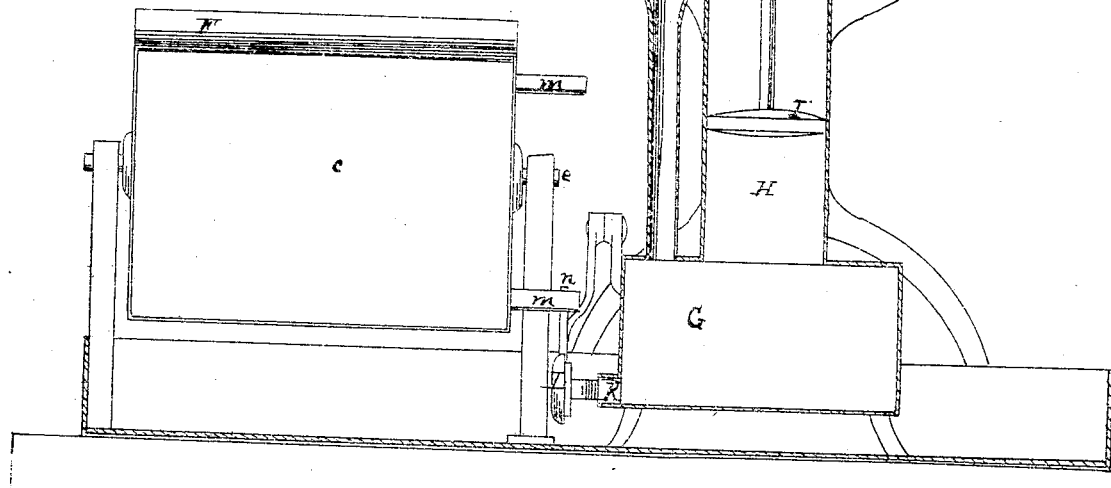
Fig. 3
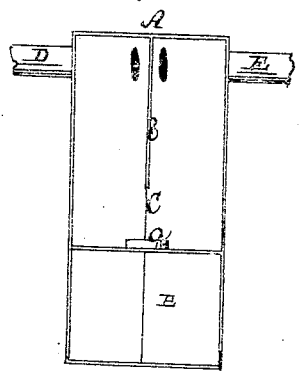
Witnesses
J. M. Coomby
A. Sellere
Inventor
Isaac P. Tice
2 Sheets
Sheet 1

I. P. Tice.
Spirit-Meter.

№ 72,700.  Patented Dec. 24, 1867.

2 Sheets
Sheet 2

Witnesses
J. W. Coomby
A. Lellere

Inventor
Isaac P. Tice

United States Patent Office.

ISAAC P. TICE, OF NEW YORK, N. Y.

Letters Patent No. 72,700, dated December 24, 1867.

---

IMPROVEMENT IN SPIRIT-METERS.

---

The Schedule referred to in these Letters Patent and making part of the same.

---

TO ALL WHOM IT MAY CONCERN:

Be it known that I, ISAAC P. TICE, of the city, county, and State of New York, have invented a new and useful Improvement on Spirit-Meters, of which the following is a full, clear, and exact description, reference being had to the accompanying drawing, forming part of this specification, and in which—

Figure 2:
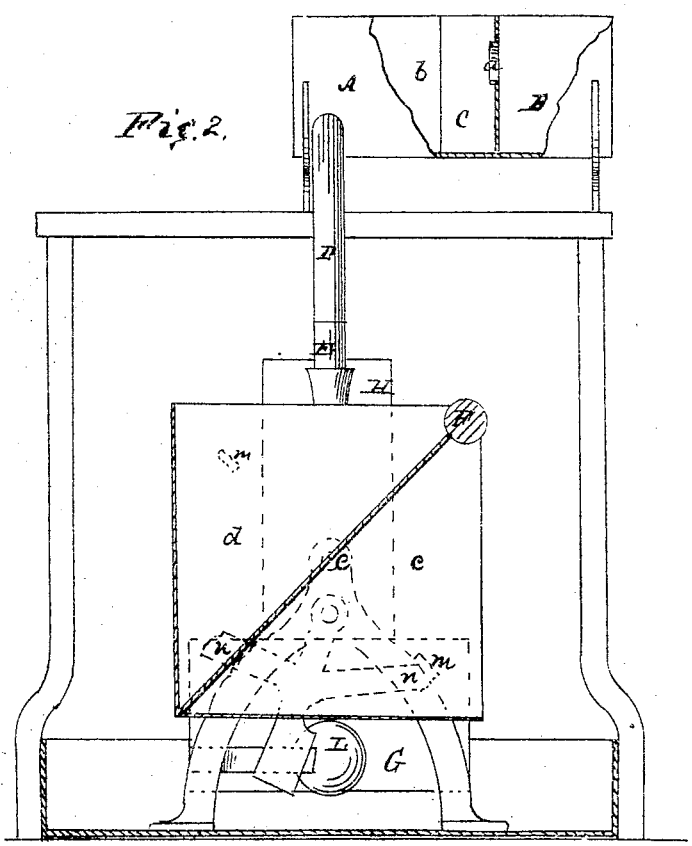

Figures 1 and 2 represent sectional elevations at right angles to each other.

Figure 3, a plan of the receiving-hopper to the meter.

Figure 4:
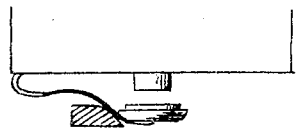

Figure 4, a plan view of a valvular device used in connection with my improvement.

This my improvement has for its object ascertaining the specific gravity or proof and quantity of spirit passed through the meter, by weight and volume combined; and the nature of my invention consists in passing the products of the still in a divided stream or streams, the one of which supplies a weighing-can or device, and the other a volume-determining cylinder or can; and my invention further consists in certain combinations of details for carrying out this my invention.

Referring to the accompanying drawing, A represents a supply-trough or hopper, divided into compartments B and C, the one, B, of which compartments, and which is the receiving-compartment from the still, communicates, by an aperture, $a$, with the other compartment C, which has a vertical partition, $b$, in it, that serves to divide the spirit issuing from the orifice $a$ into the compartment C, down, in an equable or proportional manner, pipes D E. The one, D, of these pipes, delivers or empties into a weighing-can or device, F, of any suitable description, but which is here shown as a tilting-can, made up of weighing-chambers $c$ $d$, and supported on trunnions or rocking-shaft $e$, for operation in a similar manner to other weighing-cans, the same delivering itself, as it is oscillated intermittently by the weight of the spirit, into a trough or receiver below, and recording its tilts or weight of spirit passed, by or through any suitable register connected with the can. The other, E, of said pipes, discharges into a chamber, G, that communicates with a cylinder or can, H, which is provided with a piston or float, I, carrying a rod, $f$, which has pivoted to it a ratchet-shaped rack, $g$, that, in the up stroke of the piston, gives motion to a ratchet-wheel, J, but, yielding by or through a spring, $h$, acting on its back, slips over or fails to operate, in its down stroke or action, the wheel J, which furthermore is locked from turning back by a spring-pawl, $i$. The spindle $k$ of this wheel is designed to be connected with any suitable register, the whole forming an indicator of volume, as hereinafter described. K is a discharge-nozzle to the chamber G, emptying into the receiver into which the contents of the weighing-can are discharged, and opened and closed at fixed intervals, as regulated by the tilting of the weighing-can, by or through a valve, L, which may be operated by studs $m$ $m$ on the weighing-can striking arms $n$ $n$ of the valve. This action takes place towards the termination of the tilting-strokes of the can, the one tilting-stroke serving to open and the other to close the valve.

Now, supposing the capacity of the chamber G and cylinder or can H, relatively to the supply-pipe E and weighing-can, be such that, on water passing down the pipes D and E, the can tilts and discharges and opens the outlet K without any action on the piston I, or so as only to elevate the latter into gear by its rack $g$ with the wheel J, but not sufficiently so to operate it, then, on passing spirit instead of water down the pipes D and E, it will be obvious that the increased volume of the spirit, weight for weight with water, the can F not tilting till a fixed or certain weight has been put into or on the can, will give an increased upward movement to the piston, so as, through the rack $g$ and wheel J, to operate the register with which the latter is connected.

It furthermore will be seen that the extent of this upward movement of the piston I will vary with the strength of the spirit, the motion being greater as the spirit is purer, and less as it falls below proof, by reason of the variation in volume for a given weight, and that, as the weighing-can is restrained from tilting until a certain weight, irrespective of quantity, has been poured into it, and the interval or period which the cylinder H is kept closed to receive, spirit is determined by the weighing-can through its operation on the valve L in tilting, which operation is systematic or regular with the tilting of the can, the indications made on the two registers controlled by the can F and piston I will furnish data of weight and specific gravity, from which the quantity and average proof of spirit passed through the water are readily ascertainable.

It will be apparent that the details here described may be materially changed, without altering the character of the invention; for instance, any suitable volume-indicator may be used, so long as it is under similar control by the weighing-can at fixed intervals or actions of the latter, and which need not necessarily be each tilt, and the supply of spirit to the can and volume-indicator may be in other than equal proportions, and not of necessity through a divided hopper, though the latter is preferred, as supplying from the same point of the still, and divided in a definite and positive manner between the two cans H and F.

What I here claim, and desire to secure by Letters Patent, is—

1. The combination, in a spirit-meter, of a weighing-can and can for determining volume, receiving in a given time or times an equal or proportionate supply with the weighing-can, for ascertaining the specific gravity of the fluid.

2. The combination of a float or piston with the can-determining volume for a given weight, to actuate in any suitable manner a registering-device, substantially as specified.

3. Controlling the filling and discharge of the can, which determines volume for a given weight, by the action of the weighing-can, essentially as herein set forth.

4. In combination with the devices for determining specific gravities, the hopper A, divided as at $b$, and furnished with separate discharge-pipes, D and E, substantially as specified.

5. The combination of a weighing-can or device, volume-determining cylinder or can H, with its piston I, valve L, operated by the weighing-can and gear $g$ J, essentially as described.

ISAAC P. TICE.

Witnesses:
   A. LE CLERC,
   J. W. COOMBS.